United States Patent
Kurita

(10) Patent No.: US 9,751,373 B2
(45) Date of Patent: Sep. 5, 2017

(54) DAMPER CONTROL DEVICE

(71) Applicant: KYB Corporation, Tokyo (JP)

(72) Inventor: Norihiko Kurita, Gifu (JP)

(73) Assignee: KYB Corporation, Tokyo (JP)

( * ) Notice: Subject to any disclaimer, the term of this patent is extended or adjusted under 35 U.S.C. 154(b) by 0 days.

(21) Appl. No.: 15/126,184

(22) PCT Filed: Apr. 23, 2015

(86) PCT No.: PCT/JP2015/062426
§ 371 (c)(1),
(2) Date: Sep. 14, 2016

(87) PCT Pub. No.: WO2015/163425
PCT Pub. Date: Oct. 29, 2015

(65) Prior Publication Data
US 2017/0080769 A1   Mar. 23, 2017

(30) Foreign Application Priority Data

Apr. 23, 2014  (JP) .................................. 2014-088795

(51) Int. Cl.
*B60G 17/016* (2006.01)
*B60G 17/018* (2006.01)
(Continued)

(52) U.S. Cl.
CPC ....... *B60G 17/016* (2013.01); *B60G 17/0182* (2013.01); *B60G 17/01908* (2013.01); *B60G 17/01933* (2013.01); *B60G 17/08* (2013.01); *B62K 25/04* (2013.01); *B60G 2202/24* (2013.01); *B60G 2300/12* (2013.01);
(Continued)

(58) Field of Classification Search
CPC ... B60G 17/016; B60G 17/0182; B62K 25/04
See application file for complete search history.

(56) References Cited

U.S. PATENT DOCUMENTS

| | | | |
|---|---|---|---|
| 5,408,411 A | 4/1995 | Nakamura et al. | |
| 2011/0153158 A1 | 6/2011 | Acocella | |
| 2015/0239317 A1* | 8/2015 | Kurita | B62K 25/04 701/38 |

FOREIGN PATENT DOCUMENTS

| | | | |
|---|---|---|---|
| JP | H04-237637 A | 8/1992 | |
| JP | 2007-232662 A | 9/2007 | |

(Continued)

*Primary Examiner* — Basil T Jos
(74) *Attorney, Agent, or Firm* — Rabin & Berdo, P.C.

(57) ABSTRACT

The damper control device includes a three axis rate sensor that detects a pitching angular velocity of a vehicle body of a two-wheeled vehicle, a pressure sensor that detects a pressure of a contraction-side chamber in a front-wheel side damper, a pressure sensor that detects a pressure of a contraction-side chamber of a rear-wheel side damper, and a correction unit that corrects the pitching angular velocity. The damper control device controls the pressure of the contraction-side chamber in the front-wheel side damper and the pressure of the contraction-side chamber of the rear-wheel side damper on the basis of the corrected pitching angular velocity, the pressure of the contraction-side chamber in the front-wheel side damper and the pressure of the contraction-side chamber of the rear-wheel side damper.

9 Claims, 7 Drawing Sheets

(51) Int. Cl.
*B62K 25/04* (2006.01)
*B60G 17/019* (2006.01)
*B60G 17/08* (2006.01)

(52) U.S. Cl.
CPC .............. *B60G 2400/0511* (2013.01); *B60G 2400/0522* (2013.01); *B60G 2400/0523* (2013.01); *B60G 2500/10* (2013.01); *B60G 2800/014* (2013.01)

(56) References Cited

FOREIGN PATENT DOCUMENTS

JP         2011-529822 A    12/2011
WO    WO-2014/051045 A1    4/2014

* cited by examiner

DAMPER CONTROL DEVICE

TECHNICAL FIELD

The present invention relates to a damper control device.

BACKGROUND ART

As disclosed in JP2011-529822A, in damper control devices that control damping forces of a front-wheel side damper and a rear-wheel side damper interposed between a vehicle body of a two-wheeled vehicle and a front or a rear wheel, for example, a damper control device that controls the damping force on the basis of a sky hook control is known.

In this sky hook control, the damper control device includes a stroke sensor that detects a stroke in the front wheel side damper, a stroke sensor that detects a stroke in the rear wheel side damper, and a pitching sensor that detects a pitching angular velocity of the vehicle body. Then, the damper control device calculates stroke speeds of the front-wheel side damper and the rear-wheel side damper by differentiating displacements detected by the stroke sensors, calculates damping coefficients of the front-wheel side damper and the rear-wheel side damper from the pitching angular velocity and the stroke speeds of the front and rear dampers with reference to a three-dimensional map prepared in advance, and controls the damping force of each damper in an open loop.

SUMMARY OF INVENTION

However, the damper control device disclosed in JP2011-529822A has a following problem.

On a two-wheeled vehicle, a vehicle body needs to be inclined with respect to a road surface so as not to overturn due to a centrifugal force acting on the vehicle body in turn. However, when the vehicle body is inclined, a yaw angular velocity affects the pitching angular velocity of the vehicle body. Then, the conventional damper control device fails to accurately obtain the pitching angular velocity. This possibly decreases a riding comfort on the two-wheeled vehicle.

The present invention aims to provide a damper control device capable of improving the riding comfort on a two-wheeled vehicle.

According to an aspect of the present invention, a damper control device includes a pitching angular velocity detection unit configured to detect a pitching angular velocity of a vehicle body of a two-wheeled vehicle, a front-wheel side pressure detection unit configured to detect a pressure of a contraction-side chamber in a front-wheel side damper, the front-wheel side damper being interposed between the vehicle body and a front-wheel of the two-wheeled vehicle, a rear-wheel side pressure detection unit configured to detect a pressure of a contraction-side chamber in a rear-wheel side damper, the rear-wheel side damper being interposed between the vehicle body and a rear-wheel of the two-wheeled vehicle, and a correction unit configured to corrects the pitching angular velocity, wherein the pressure of the contraction-side chamber in the front-wheel side damper and the pressure of the contraction-side chamber in the rear-wheel side damper are controlled on the basis of the corrected pitching angular velocity, the pressure of the contraction-side chamber in the front-wheel side damper, and the pressure of the contraction-side chamber in the rear-wheel side damper.

DESCRIPTION OF EMBODIMENTS

With reference to the attached drawings, embodiments of the present invention will be described.

Figure 1:
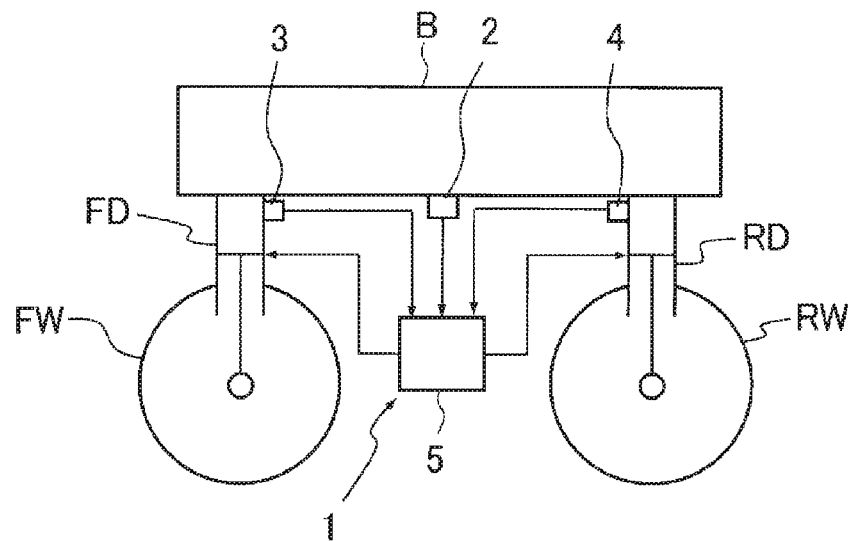
FIG. 1 is a schematic configuration diagram of a damper control device according to one embodiment.
Figure 2:
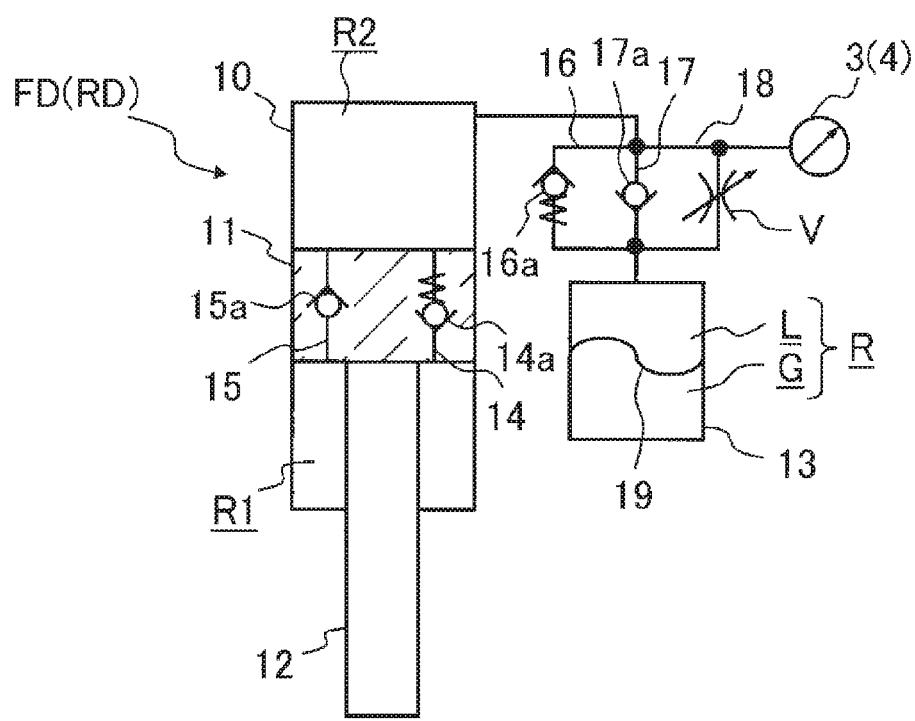
FIG. 2 is a schematic diagram of a front-wheel side damper and a rear-wheel side damper of the damper control device according to the one embodiment.
Figure 3:
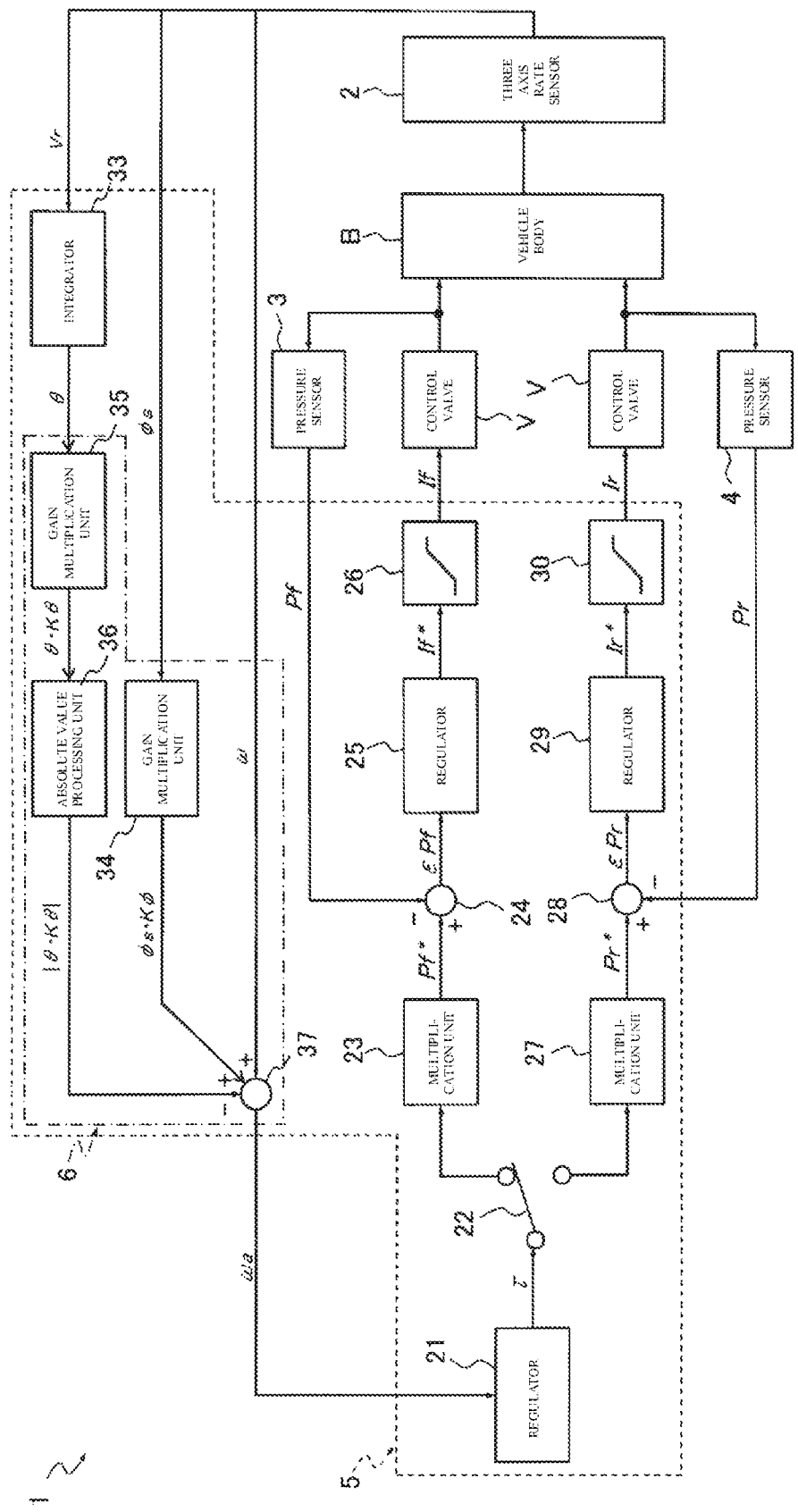
FIG. 3 is a control block diagram of the damper control device according to the one embodiment.

As illustrated in FIGS. 1 to 3, a damper control device 1 according to one embodiment is configured, in this example, to control a pressure Pf of a contraction-side chamber R2 in a front-wheel side damper FD interposed between a vehicle body B and a front wheel FW of a two-wheeled vehicle, and a pressure Pr of a contraction-side chamber R2 in a rear-wheel side damper RD interposed between the vehicle body B and a rear wheel RW. The damper control device 1 includes a three axis rate sensor 2 as a pitching angular velocity detection unit that detects a pitching angular velocity ω of the vehicle body B, a pressure sensor 3 as a front-wheel side pressure detection unit that detects the pressure Pf, a pressure sensor 4 as a rear-wheel side pressure detection unit that detects the pressure Pr, and a control unit 5 that controls the pressure Pf and the pressure Pr on the basis of the pitching angular velocity ω, the pressure Pf, and the pressure Pr.

The following describes each member in detail. As illustrated in FIG. 2, the front-wheel side damper FD and the rear-wheel side damper RD include, for example, a cylinder 10, a piston 11, a piston rod 12, a tank 13, an expansion-side damping passage 14, a contraction-side passage 15, a contraction-side damping passage 16, a suction passage 17, a bypass passage 18, and a control valve V.

The piston 11 is slidably inserted into the cylinder 10 to partition the inside of the cylinder 10 into an expansion-side chamber R1 filled with liquid and a contraction-side chamber R2 similarly filled with the liquid. Water, a water solution, and similar liquid can be utilized as the liquid, besides a hydraulic oil. The piston rod 12 is movably inserted into the cylinder 10 and coupled to the piston 11. The tank 13 internally includes a reservoir R communicated with the contraction-side chamber R2. The reservoir R includes a liquid chamber L and an gas chamber G partitioned by an elastic partition wall 19 provided in the tank 13. Instead of the elastic partition wall 19, the inside of the tank 13 may be partitioned into the liquid chamber L and the gas chamber G by a free piston slidably inserted into the tank 13. The expansion-side damping passage 14 gives a resistance to a flow of the liquid from the expansion-side chamber R1 to the contraction-side chamber R2. The contraction-side passage 15 is provided in parallel with respect to the expansion-side damping passage 14 and allows only the flow of the liquid from the contraction-side chamber R2 to the expansion-side chamber R1. The contraction-side damping passage 16 gives a resistance to a flow of the liquid from the contraction-side chamber R2 to the reservoir R. The suction passage 17 is provided in parallel with respect to the contraction-side damping passage 16 and allows only the flow of the liquid from the reservoir R to the contraction-side chamber R2. The bypass passage 18 is provided in parallel with respect to the contraction-side damping passage 16 and the suction passage 17 and allows the contraction-side chamber R2 to communicate with to the reservoir R. The control valve V is provided at an intermediate position of the bypass passage 18 as a pressure control element to adjust the pressure in the contraction-side chamber R2. In this example, the lower end in FIG. 2 of the piston rod 12 that projects from the cylinder 10 is coupled to the front wheel FW or the rear wheel RW of the two-wheeled vehicle, and the upper end in FIG. 2 of the cylinder 10 is coupled to the vehicle body B of the two-wheeled vehicle.

The expansion-side damping passage 14 includes a valve 14a at an intermediate position, and gives the resistance to the flow of the passing liquid by this damping valve 14a. The contraction-side passage 15 includes a check valve 15a at an intermediate position, and restricts the flow of the passing liquid in a one-way direction by this check valve. The contraction-side damping passage 16 includes a damping valve 16a at an intermediate position, and gives the resistance to the flow of the passing liquid by this damping valve 16a. The suction passage 17 includes a check valve 17a at an intermediate position, and restricts the flow of the passing liquid in a one-way direction by this check valve 17a. The check valve 15a, which is provided at the intermediate position of the contraction-side passage 15, allows only the flow of the liquid from the contraction-side chamber R2 to the expansion-side chamber R1, and is set to give the resistance to the flow of the liquid within an extent that has no influence on a contraction-side damping force. However, the check valve 15a may be configured to function as a damping valve that actively gives a differential pressure to the contraction-side chamber R2 and the expansion-side chamber R1. In this case, a passage may be provided so as to integrate the expansion-side damping passage 14 with the contraction-side passage 15, i.e. so as to give the resistance to the flow while allowing the liquid to bidirectionally pass through the expansion-side chamber R1 and the contraction-side chamber R2.

The control valve V is, for example, an electromagnetic valve and the like that drive a valve element by a solenoid, and the like. The control valve V is configured to adjust a position of the valve element depending on the amount of a supplied current to vary a flow passage area. This enables variation of the resistance given to the liquid flowing through the bypass passage 18. As the control valve V, a valve of a variable throttle type may be employed, and a valve of an on-off type may also be employed.

When the front-wheel side damper FD and the rear-wheel side damper RD extend, the liquid moves from the expansion-side chamber R1, which is compressed, to the contraction-side chamber R2, which is expanded, via the expansion-side damping passage 14. Then, a differential pressure is generated between the extension side chamber R1 and the contraction-side chamber R2 by the resistance that the extension-side damping passage 14 gives to the flow of the liquid, and an extension-side damping force that suppresses the extension is exhibited in accordance with this differential pressure. Inside the contraction-side chamber R2 to be expanded, the liquid is supplied from the reservoir R via the suction passage 17 to compensate the volume of the piston rod 12 going out from the inside of the cylinder 10. Accordingly, the front-wheel side damper FD and the rear-wheel side damper RD function as passive dampers whose damping force characteristics do not vary during the extension.

When the front-wheel side damper FD and the rear-wheel side damper RD contract, the liquid moves from the contraction-side chamber R2, which is compressed, to the expansion-side chamber R1, which is expanded, via the contraction-side passage 15. Since the piston rod 12 enters into the inside of the cylinder 10, the excessive liquid inside the cylinder 10 is discharged from the contraction-side chamber R2 to the reservoir R via the contraction-side damping passage 16 and the bypass passage 18. Thus, since the liquid is discharged from the cylinder 10 to the reservoir R in amount equivalent to the volume of the piston rod 12 entering into the inside of the cylinder 10, the volume change in the cylinder resulting from entry of the piston rod 12 is compensated for. Then, when the liquid moving from the contraction-side chamber R2 to the reservoir R passes through the contraction-side damping passage 16 and the control valve V, the contraction-side damping passage 16 and the control valve V give the resistance to the flow of the liquid. This increases the pressure inside the cylinder 10 to cause the front-wheel side damper FD and the rear-wheel side damper RD to exhibit the contraction-side damping force that suppresses contraction.

Here, if an opening of the control valve V (the flow passage area in the control valve V) that is provided at the intermediate position of the bypass passage 18 is varied, the area of the flow passage that allows the contraction-side chamber R2 to communicate with the reservoir R varies. Thus, the pressure in the contraction-side chamber R2 can be controlled by the opening of the control valve V. More specifically, the liquid that is extruded from the cylinder 10 by entering of the piston rod 12 to the inside of the cylinder 10 attempts to pass the contraction-side damping passage 16 and the bypass passage 18 in moving to the reservoir R. At this time, since decreasing the opening of the control valve V makes hard for the liquid to move to the reservoir R, the pressure inside the contraction-side chamber R2 increases. Since increasing the opening the control valve V makes easy for the liquid to move to the reservoir R, the pressure inside the contraction-side chamber R2 decreases. The front-wheel side damper FD and the rear-wheel side damper RD receive the pressure inside the contraction-side chamber R2 with the piston 11 to exhibit the contraction-side damping force that suppresses the contraction. Accordingly, the contraction-side damping force can be controlled by controlling the pressure in the contraction-side chamber R2. When the flow passage area in the control valve V is minimized at an arbitrary contraction speed, the pressure of the contraction-side chamber R2 in the front wheel side damper FD and the rear wheel side damper RD is maximized. It should be noted that, the pressure in the contraction-side chamber R2 of the front-wheel side damper FD and the rear-wheel side damper RD also depends on the contraction speed. The control valve V may be configured to cutoff the bypass passage 18 when the flow passage area is minimized.

If electrorheological fluid or magnetorheological fluid is filled in the cylinder 10 in the front-wheel side damper FD and the rear-wheel side damper RD, a device capable of applying a electric field or a magnetic field may be incorporated in the bypass path 18 instead of a valve and this device may be used as a pressure control element. In this case, this device adjusts the magnitude of an electric field or magnetic field in response to a command from the control unit 5 to vary resistance given to the fluid flowing in the bypass path 18. This enables control of the pressure in the contraction-side chamber R2.

The pressure sensor 3 may be mounted on any position to be capable of detecting the pressure Pf in the contraction-side chamber R2 of the front-wheel side damper FD. In this embodiment, the pressure sensor 3 is mounted on the upper stream of the contraction-side damping passage 16 that allows the contraction-side chamber R2 to communicate with the reservoir R, and on the upper stream of the control valve V in the bypass passage 18. The pressure sensor 3 is configured to detect the pressure Pf in the contraction-side chamber R2 in the front-wheel side damper FD to output to the control unit 5. The pressure sensor 4 may be mounted on any position to be capable of detecting the pressure Pr in the contraction-side chamber R2 of the rear wheel side damper RD. In this embodiment, the pressure sensor 4 is mounted on the upper stream of the contraction-side damping passage 16 that allows the contraction-side chamber R2 to communicate with the reservoir R, and on the upper stream of the control valve V in the bypass passage 18. The pressure sensor 4 is configured to detect the pressure Pr in the contraction-side chamber R2 in the rear wheel side damper RD to output to the control unit 5.

According to the front-wheel side damper FD and the rear-wheel side damper RD configured as described above, the pressure in the contraction-side chamber R2 can be controlled by the bypass passage 18 and the pressure control element added to a common damper. Further, the pressure sensors 3 and 4 are easily disposed. The installation of the cylinder 10 to the vehicle body B side causes the pressure sensors 3 and 4 and the pressure control element to be disposed on the vehicle body B side. This eliminates the need for disposing the pressure sensors 3 and 4 and the pressure control element on the wheel side to which the vibration with high frequency and large amplitude is input. This improves the reliability of the damper control device 1. In addition, this facilitates to arrange a signal line and a harness used to extract signals and supply a current, and reduces the deterioration thereof.

The three axis rate sensor 2 is such as a composite sensor that uses a rate gyro, and detects angular velocities around three axes. One of the angular velocities is the pitching angular velocity ω as an angular velocity around an axis in a lateral direction of the vehicle body B, and the others are angular velocities around an axis in a vertical direction and around an axis in a front-rear direction of the vehicle body B. That is, the three axis rate sensor 2 detects the pitching angular velocity ω around the axis in the lateral direction of the vehicle body B, and further, detects a roll angular velocity Vr around the axis in the front-rear direction of the vehicle body B and a yaw angular velocity φ around the axis in the vertical direction of the vehicle body B. The roll angular velocity Vr that is detected by the three axis rate sensor 2 is input to an integrator 33, which is disposed on the control unit 5, to be integrated. This enables the obtainment of the roll angle. In other words, in this embodiment, a roll angle detection unit is configured by the three axis rate sensor 2 and the integrator 33. Since the yaw angular velocity φ of the vehicle body B is detected by the three axis rate sensor 2, in this embodiment, a yaw angular velocity detection unit is configured by the three axis rate sensor 2.

Sensors which detect separately detect the pitching angular velocity, the roll angle, and the yaw angular velocity of the vehicle body B may be used instead of the three axis rate sensor 2. Use of the three axis rate sensor 2 enables minimization of the number of the sensors. The three axis rate sensor 2 is provided on a center of the pitching rotation of the vehicle body B and near the center, or near a center of gravity of the vehicle body B, and detects the pitching angular velocity, the roll angular velocity, and the yaw angular velocity of the vehicle body B to output to the control unit 5. The mounting position of the three axis rate sensor 2 to the vehicle body B may be a position other than the proximity of the rotational center of the pitching and the proximity of the center of gravity of the vehicle body B.

As illustrated in FIG. 3, the control unit 5 includes a correction unit 6, a regulator 21, a switch 22, a multiplication unit 23, a deviation calculation unit 24, a regulator 25, a limiter 26, a multiplication unit 27, a deviation calculation unit 28, a regulator 29, and a limiter 30.

The correction unit 6 corrects the pitching angular velocity ω detected by the three axis rate sensor 2. The regulator 21 uses the corrected pitching angular velocity ω to obtain a target torque τ that reduces the pitching of the vehicle body B. The switch 22 uses a sign of the target torque τ obtained by the regulator 21 to select a damper that can generate the contraction-side damping force in the direction to reduce the pitching of the vehicle body B. The multiplication unit 23 multiplies the target torque τ by a coefficient Kf to obtain a target pressure Pf* of the contraction-side chamber R2 of the front-wheel side damper FD when the switch 22 selects the front-wheel side damper FD to input the target torque τ. The deviation calculation unit 24 obtains a deviation εPf between the pressure Pf* obtained by the multiplication unit 23 and the pressure Pf detected by the pressure sensor 3. The regulator 25 uses the deviation εPf obtained by the deviation calculation unit 24 to obtain a target current If* provided to the control valve V in the front-wheel side damper FD. The limiter 26 performs a saturation calculation that regulates the lower limit and the upper limit of the target current If* to obtain a final current command If provided to the control valve V in the front-wheel side damper FD. The multiplication unit 27 multiplies the target torque τ by a coefficient Kr to obtain a target pressure Pr* of the contraction-side chamber R2 of the rear-wheel side damper RD when the switch 22 selects the rear-wheel side damper RD to input the target torque τ. The deviation calculation unit 28 obtains a deviation εPr between the pressure Pr* obtained by the multiplication unit 27 and the pressure Pr detected by the pressure sensor 4. The regulator 29 uses the deviation εPr obtained by the deviation calculation unit 28 to obtain a target current Ir* provided to the control valve V in the rear-wheel side damper RD. The limiter 30 performs a saturation calculation that regulates the lower limit and the upper limit of the target current Ir* to obtain a final current command Ir provided to the control valve V in the rear-wheel side damper RD.

The regulator 21 uses the pitching angular velocity ω corrected by the correction unit 6 to obtain the target torque τ that reduces the pitching of the vehicle body B. Specifically, the regulator 21 uses the pitching angular velocity ω to obtain the target torque τ where the pitching angular velocity of the vehicle body B approaches zero. The regulator 21 may multiply the pitching angular velocity ω by a proportional gain to calculate the target torque τ, or may use a function using the pitching angular velocity ω as a parameter or may perform a map calculation to obtain the target torque τ.

The switch 22 uses the sign of the target torque τ to select a damper, which is contracted by the pitching of the vehicle body B and which can generate the contraction-side damping force in the direction to reduce the pitching of the vehicle body B, out of the front-wheel side damper FD and the rear-wheel side damper RD. A specific example is described. In the specific example, a rotation direction in which the vehicle body B inclines to the rear-wheel side is positive. If the sign of the target torque τ is negative, since the target torque τ is a force in a direction to reduce the pitching of the vehicle body B, the vehicle body B is inclining to the rear-wheel side because of the pitching. In this case, it is the rear-wheel side damper RD that can generate the contraction-side damping force in the direction to reduce the pitching of the vehicle body B to the rear-wheel side. Accordingly, in this case, the switch 22 selects the rear-wheel side damper RD to input the target torque τ to the multiplication unit 27. On the other hand, if the sign of the target torque τ is positive, the pitching is occurring in a direction in which the vehicle body B inclines to the front wheel side. Accordingly, in this case, the switch 22 selects the front-wheel side damper FD that can generate the contraction-side damping force in the direction to reduce the pitching of the vehicle body B to the front-wheel side, and inputs the target torque τ to the multiplication unit 23.

The multiplication unit 27 multiplies the target torque τ by the coefficient Kr to obtain the target pressure Pr* of the contraction-side chamber R2 of the rear-wheel side damper RD. The coefficient Kr is a coefficient for converting the target torque τ to the target pressure Pr* of the contraction-side chamber R2 of the rear-wheel side damper RD, and determined in consideration of mainly a distance from the center of gravity of the vehicle body to the mounting position of the rear-wheel side damper RD, the cross-sectional area of the piston 11, and similar factor. The coefficient Kr is configured in a negative value. Instead of the multiplication unit 27, a calculation unit that performs the map calculation using the target torque τ as the parameter to obtain the target pressure Pr* may be used.

The multiplication unit 23 multiplies the target torque τ by the coefficient Kf to obtain the target pressure Pf* of the contraction-side chamber R2 of the front-wheel side damper FD. The coefficient Kf is a coefficient for converting the target torque τ to the target pressure Pf* of the contraction-side chamber R2 of the front-wheel side damper FD, and determined in consideration of mainly a distance from the center of gravity of the vehicle body to the mounting position of the front-wheel side damper FD, the cross-sectional area of the piston 11, and similar factor. Instead of the multiplication unit 23, a calculation unit that performs the map calculation using the target torque τ as the parameter to obtain the target pressure Pf* may be used.

The deviation calculation unit 24 and the regulator 25 constitute a pressure feedback loop. The regulator 25 is a compensator such as a PID compensator. The regulator 25 may be a PD compensator, an H∞ compensator or the like.

The deviation calculation unit 28 and the regulator 29 constitute a pressure feedback loop. As well as the regulator 25, the regulator 29 is a compensator such as a PID compensator. The regulator 29 also may be a PD compensator, an H∞ compensator or the like.

The current commands output by the limiters 26 and 30 are transmitted to the corresponding control valves V in the front-wheel side damper FD and the rear-wheel side damper RD. The control valves V adjusts the opening as the current commands to control the pressure of the contraction-side chamber R2 of the front-wheel side damper FD and the rear-wheel side damper RD. As the result, the damper control device 1 reduces the pitching of the vehicle body B. It should be noted that any one of the multiplication unit 23 and the multiplication unit 27 is the multiplication unit corresponds to the damper not selected by the switch 22 out of the front-wheel side damper FD and the rear-wheel side damper RD. Such multiplication unit may be input zero to reduce the contraction-side damping force of the not selected damper. Alternatively, the target pressure corresponding to the unselected damper out of the target pressures Pf* and Pr* may be zeroed or minimized to reduce the compression side damping force of the unselected damper. Alternatively, the control valve V of the unselected damper may be controlled to output a contraction-side damping force determined in advance. In the case of performing integral compensation by the regulators 25 and 29, no calculation may be performed for a control path unselected by the switch 22 and a current command that is determined in advance may be constantly output to the control valve V of the unselected damper to avoid the saturation of an integrated value.

As described above, the control unit 5 uses the pitching angular velocity ω to obtain the target torque τ that reduces the pitching of the vehicle body B. Then, the control unit 5 determines the target pressure Pf* of the contraction-side chamber R2 of the front-wheel side damper FD to control the pressure Pf of the contraction-side chamber R2 of the front-wheel side damper FD, or determines the target pressure Pr* of the contraction-side chamber R2 of the rear-wheel side damper RD to control the pressure Pr of the contraction-side chamber R2 of the rear-wheel side damper RD.

Figure 4:
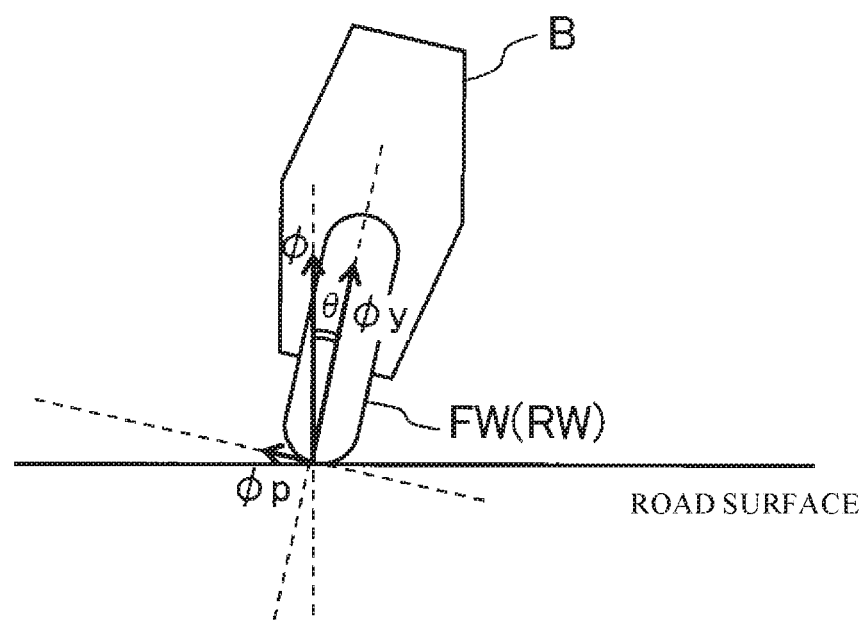
FIG. 4 is a drawing for explaining yawing during the turning of a two-wheeled vehicle, and rotational angular velocities of this yawing about vertical and horizontal axes of a vehicle body.

When the two-wheeled vehicle turns, yawing where the vehicle body B rotates to change the travelling direction occurs. In representing the yaw angular velocity in vector, the yaw angular velocity is represented by a vector perpendicular to a rotating surface. As illustrated in FIG. 4, when the vehicle body B turns in a state where the vehicle body B is inclined with a roll angle θ, the yaw angular velocity φ, which is represented by an angular velocity vector, of the vehicle body B around an axis perpendicular to the road surface can be resolved to a component φy (φy=φ·cos θ) around the axis in the vertical direction of the vehicle body B and a component φp (φ=φ·sin θ) around the axis in the lateral direction of the vehicle body B.

The component φp acts in a direction identical to the direction of the pitching angular velocity detected by the three axis rate sensor 2. Accordingly, during the turn of the two-wheeled vehicle, the component φp of the yaw angular velocity φp is superimposed to the pitching angular velocity detected by the three axis rate sensor 2 corresponding to the roll angle θ of the vehicle body B. In order to perform the control to reduce the pitching of the vehicle body B with high accuracy, it is preferred to remove the component φp of the yaw angular velocity φ unrelated to the pitching from the pitching angular velocity to be detected.

Therefore, as illustrated in FIG. 3, the damper control device 1 according to the embodiment includes the correction unit 6 that corrects the pitching angular velocity so as to remove the influence of the yawing on the pitching angular velocity while the vehicle body B is inclining. In this embodiment, the correction unit 6 corrects the pitching angular velocity on the basis of the roll angle detected by the roll angle detection unit and the yaw angular velocity detected by the yaw angular velocity detection unit.

As described above, the roll angle detection unit is constituted of the three axis rate sensor 2 and the integrator 33 disposed on the control unit 5, and integrates the roll angular velocity Vr detected by the three axis rate sensor 2 with the integrator 33 to obtain the roll angle θ. The yaw angular velocity detection unit is constituted of the three axis rate sensor 2 that detects the yaw angular velocity.

The correction unit 6 removes the component φp (φp=φ·sin θ) around the axis in the lateral direction of the vehicle body B of the yaw angular velocity φ from the pitching angular velocity φ to correct the pitching angular velocity. Assuming the yaw angular velocity detected by the three axis rate sensor 2 to φs, the correction unit 6 uses the detected yaw angular velocity φs to obtain the yaw angular velocity φ perpendicular to the road surface by calculating φ=φs/cos θ, multiplies the yaw angular velocity φ by sin θ, and subtracts from the pitching angular velocity ω. That is, the correction unit 6 calculates φp=φs·tan θ to obtain the component φp and subtracts from the pitching angular velocity ω. If the roll angle θ has a small value, the component φ can be considered as φs·θ approximately. In this embodiment, considering the amount of the variation, the pitching angular velocity ω is corrected so as to obtain a sum of a value obtained by multiplying the detected yaw angular velocity φs by a gain Kφ equivalent to a differential value of the roll angle θ and a value obtained by multiplying the roll angle θ by a gain Kθ equivalent to a differential value of the detected yaw angular velocity φs, and subtract from the pitching angular velocity ω. Thus, in the case where the pitching angular velocity ω is corrected by obtaining the component φp with the calculation of φp=Kφ·φs+Kθ·θ, an automatic adjustment of the gain Kφ and the gain Kθ ensures to obtain the component φp with high accuracy.

Specifically, the correction unit 6 includes a gain multiplication unit 34 that multiplies the yaw angular velocity φs detected by the three axis rate sensor 2 by the gain Kφ, a gain multiplication unit 35 that multiplies the roll angle θ of the vehicle body B by the gain Kθ, an absolute value processing unit 36 that performs the absolute value processing of the roll angle θ multiplied by the gain Kθ, and a correction calculation unit 37 that subtracts |θ·Kθ| from the pitching angular velocity ω and adds φs·Kφ.

The gain multiplication unit 34 multiplies the value of the yaw angular velocity φs detected by the three axis rate sensor 2 by the gain Kφ such that the component φp superimposed on the pitching angular velocity ω can be removed. Here, when a steering angle of a handlebar of the two-wheeled vehicle is small, the yaw angular velocity φs that is detected by the three axis rate sensor 2 is equal to the component φy of the yaw angular velocity φ around the axis in the vertical direction of the vehicle body B. Since the component φy is φ·cos θ as described above, it is φp=φ·sin θ=φs·tan θ. Accordingly, the value of the component φp varies depending on the roll angle θ. However, the correction unit 6 obtains the value multiplied the yaw angular velocity φs detected by the three axis rate sensor 2 by the gain Kφ in the gain multiplication unit 34, and uses this value to remove the component φp from the pitching angular velocity ω. While the gain Kφ is set to the value equivalent to the differential value of the roll angle θ, setting a condition appropriate to the two-wheeled vehicle ensures to obtain a theoretically optimal value. It should be noted that the influence of the yaw angular velocity φ on the pitching angular velocity ω of the vehicle body B varies corresponding to the roll angle θ. Accordingly, as described above, the gain Kφ may vary the value corresponding to the roll angle θ, such as Kφ=tan θ.

As well as the gain multiplication unit 34, the gain multiplication unit 35 multiplies the value of the roll angle θ by the gain Kθ such that the component φp superimposed on the pitching angular velocity ω can be removed. It should be noted that, while the gain Kθ is the value equivalent to the differential value of the yaw angular velocity φ, setting a condition appropriate to the two-wheeled vehicle ensures to obtain a theoretically optimal value. The absolute value processing unit 36 multiplies the roll angle θ by the gain Kθ to perform the absolute value processing. The absolute value processing unit 36 may perform the absolute value processing before multiplying the gain Kθ. In considering removing the influence of the yaw angular velocity φ on the pitching angular velocity ω, even if the vehicle body B is rolling to any of right and left, the influence of the yaw angular velocity φ on the pitching angular velocity ω is similar. Accordingly, in this embodiment, the roll angle θ is performed the absolute value processing.

In this embodiment, the correction calculation unit 37 subtracts |θ·Kθ| from the pitching angular velocity ω and outputs the value obtained by adding φs·Kφ as a corrected pitching angular velocity ωa to input to the regulator 21. In the following process, as described above, in the control unit 5, the regulator 21 obtains the target torque τ, the switch 22 uses the sign of the target torque τ obtained by the regulator 21 to select the damper that can generate the contraction-side damping force in the direction to reduce the pitching of the vehicle body B, the target pressure of the damper selected by the switch 22 is obtained, and the final current command is provided to the control valve V.

Thus, a damper control device 31 according to the embodiment can remove the component of the yawing superimposed during the turn of the vehicle body B from the pitching angular velocity ω detected by the three axis rate sensor 2 as the pitching angular velocity detection unit. This ensures to detect the pitching angular velocity ω generated by only the pitching of the vehicle body B with high accuracy. Accordingly, the front-wheel side damper FD or the rear-wheel side damper RD can output the damping force appropriate for reducing the pitching of the vehicle body B. Then, the riding comfort on the vehicle can be more improved.

The difference of the operation method of the two-wheeled vehicle unique to the user of the two-wheeled vehicle, for example, the difference of the way to incline the vehicle body B during the turn, the way to raise, the posture of the user during the turn, and the seating position sometimes provide characteristics to the influence on the pitching angular velocity caused by the yawing. In this case, it is convenient that the correction of the pitching angular velocity corresponding to the characteristics of the user can be made. Accordingly, a program capable of tuning the correction of the pitching angular velocity of the damper control device 1 may be stored in a memory device of the control unit 5 in advance and executed according to the user's desire. Specifically, in the case of performing the above tuning, the user may be let to travel along a path determined in advance on such a flat road that pitching does not occur, optimal values of the gains Kθ and Kφ in correcting the pitching angular velocity ω detected by the three axis rate sensor 2 may be obtained using the roll angle θ and the yaw angular velocity φs of the vehicle body B, and the gains Kθ and Kφ may be set at the optimal values. By doing so, the correction matching the user's habit can be made, wherefore ride comfort on the vehicle can be further improved.

As described above, the control unit 5 uses the pitching angular velocity ω, the roll angular velocity Vr and the yaw angular velocity φs, which are detected by the three axis rate sensor 2, to obtain the target pressure Pf* of the contraction-side chamber R2 of the front-wheel side damper FD or the target pressure Pr* of the contraction-side chamber R2 of the rear-wheel side damper RD. Then, the control unit 5 feeds back the pressure Pf detected by the pressure sensor 3 to output the current command to the control valve V such that the pressure Pf of the contraction-side chamber R2 of the front-wheel side damper FD is the obtained target pressure Pf*, or feeds back the pressure Pr detected by the pressure sensor 4 to output the current command to the control valve V such that the pressure Pr of the contraction-side chamber R2 of the rear-wheel side damper RD is the obtained the target pressure Pr*.

Although not shown, the control unit 5 may be, for example, specifically include, as hardware resources, an A/D converter that takes in signals output from the three axis rate sensor 2 and the pressure sensors 3 and 4, a memory device such as a ROM (Read Only Memory) that stores a program used for necessary processings for the above control, an arithmetic device such as a CPU (Central Processing Unit) that performs processings based on the above program, and a memory device such as a RAM (Random Access Memory) that provides a memory area for the CPU, and each part of the above control unit 5 is realized by the CPU executing the above program.

Thus, the damper control device 1 according to the embodiment controls the pressure Pf and the pressure Pr on the basis of the pitching angular velocity ω, the roll angle θ, and the yaw angular velocity φs of the vehicle body B, and the pressure Pf of the contraction-side chamber R2 in the front-wheel side damper FD and the pressure Pr of the contraction-side chamber R2 in the rear-wheel side damper RD. This eliminates the need for the stroke sensor, and significantly facilitates the installation to the two-wheeled vehicle.

The damper control device 1 controls the pressure in the contraction-side chamber R2 instead of adjusting the damping coefficient in the front-wheel side damper FD and the rear-wheel side damper RD. This prevents from generating errors between the damping force to be output by each damper and the damping force actually being output caused by such as the change of the oil temperature in the damper. Then, the riding comfort on the two-wheeled vehicle can be improved.

Here, in a conventional control unit, when the expansion-side damping force in the front-wheel side damper and the rear-wheel side damper excessively decreases in the case of such as the occurrence of the failure of the operation, the problem of the decrease of the stability of the vehicle body posture of the two-wheeled vehicle possibly occurs.

In view of this, the damper control device 1 according to the embodiment uses the pitching angular velocity ω to obtain the target torque τ for reducing the pitching of the vehicle body B, uses the target torque τ to select the damper that is contracted by the pitching out of the front-wheel side damper FD and the rear-wheel side damper RD, obtains the target pressure of the contraction-side chamber R2 in the selected damper of the target pressure Pf* and the target pressure Pr*, and feeds back the pressure of the contraction-side chamber R2 of the selected damper of the pressure Pf and the pressure Pr to control the pressure of the contraction-side chamber R2 of the selected damper.

Accordingly, in the damper control device 1, it is enough for the reduction of the pitching of the vehicle body B only to select the damper that can generate the contraction-side damping force for reducing the pitching of the vehicle body B to control the pressure of the contraction-side chamber R2. This eliminate the need for the control of the expansion-side damping force in the front-wheel side damper FD and the rear-wheel side damper RD, and ensures the front-wheel side damper FD and the rear-wheel side damper RD to function as a passive damper during the expansion operation. As a result, this prevents the expansion-side damping force in the front-wheel side damper FD and the rear-wheel side damper RD from excessively decreasing, and reduces the possibility of the decrease of the stability of the vehicle body posture of the two-wheeled vehicle.

Figure 5:
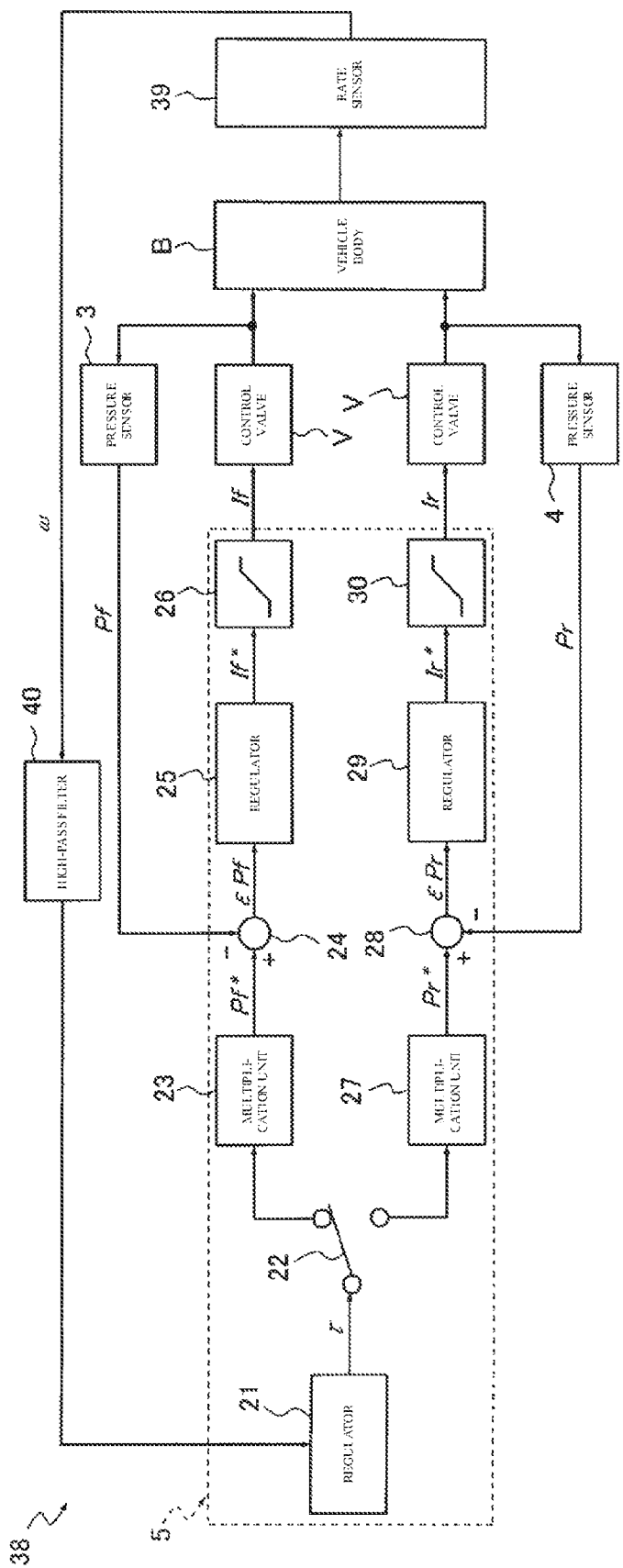
FIG. 5 is a control block diagram of a damper control device in one typical modification of the one embodiment.

Next, a damper control device 38 of a modification of the one embodiment is described. As illustrated in FIG. 5, the damper control device 38 is formed by partially changing the configuration of the damper control device 1 of the one embodiment illustrated in FIG. 3. The damper control device 38 includes a rate sensor 39 instead of the three axis rate sensor 2, and a high-pass filter 40 inserted into the latter part of the rate sensor 39. The high-pass filter 40 filters the pitching angle velocity ω detected by the rate sensor 39. The pitching angle velocity ω that is processed by the high-pass filter 40 is to be input to the regulator 21, and the high-pass filter 40 configures the correction unit.

In this case, a one axis rate sensor is used as the rate sensor 39 because it is only necessary for the rate sensor 39 to detect only the pitching angular velocity ω of the vehicle body B instead of detecting the angular velocities of the three axes.

Thus, processing the pitching angle velocity ω detected by the rate sensor 39 with the high-pass filter 40 ensures to remove a steady component of the yawing of the vehicle body B superimposed on the pitching angular velocity ω detected by the rate sensor 39 during the turn of the two-wheeled vehicle. This ensures to extract the pitching angular velocity approximate to the real pitching angular velocity of the vehicle body B.

Accordingly, the damper control device 38 can, by using the high-pass filter 40, remove the component of the yawing superimposed on the pitching angular velocity ω during the turn of the vehicle body B from the pitching angular velocity ω detected by the rate sensor 39 as the pitching angular velocity detection unit. Thus, the pitching angular velocity ω that is generated by only the pitching of the vehicle body B can be detected with high accuracy. This enable the front-wheel side damper FD or the rear-wheel side damper RD to output the damping force appropriate to reducing the pitching of the vehicle body B. Then, the riding comfort on the vehicle can be more improved.

Figure 6:
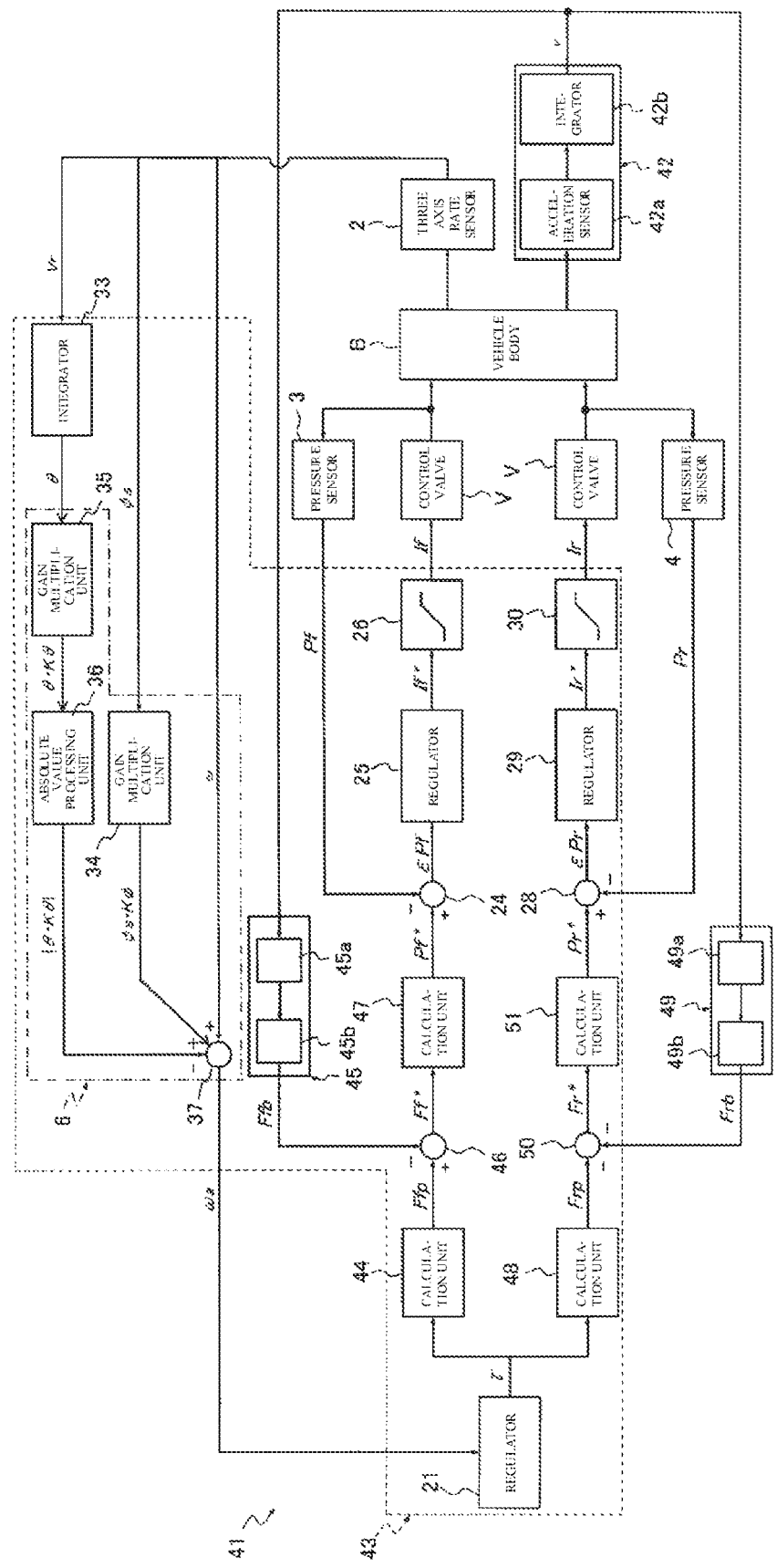
FIG. 6 is a control block diagram of the damper control device according to another embodiment.

Next, a damper control device 41 according to another embodiment is described. As illustrated in FIG. 6, the damper control device 41 further includes a velocity detection unit 42 that detects a vertical direction velocity "v" of the vehicle body B, and differs from the damper control device 1 of the above embodiment in the point that a control unit 43 controls a pressure Pf of a contraction-side chamber R2 of a front-wheel side damper FD and a pressure Pr of a contraction-side chamber R2 of a rear-wheel side damper RD also in consideration of the vertical direction velocity. The following describes points of the difference between the damper control device 41 of the other embodiment and the damper control device 1 of the one embodiment are in detail. Similar members and the like are only denoted by the same reference signs and not described in detail since description is repeated.

The velocity detection unit 42 includes an acceleration sensor 42a that detects the acceleration in the vertical direction of the vehicle body B, and an integration unit 42b that integrates the acceleration in the vertical direction of the vehicle body B detected by the acceleration sensor 42a to obtain the vertical direction velocity "v" of the vehicle body B. The integration unit 42b may be integrated into the control unit 43. The vertical direction velocity "v" is input to the control unit 43.

The control unit 43 has a configuration where the switch 22, the multiplication unit 23, and the multiplication unit 27 is removed from the control unit 5 of the damper control device 1 of the one embodiment, and thus changed control unit 5 further includes a calculation unit 44, a calculation unit 48, a regulator 45, a regulator 49, an addition unit 46, an addition unit 50, a calculation unit 47, and a calculation unit 51.

The calculation unit 44 uses the target torque τ to calculate a pitching reducing damping force Ffp to be output to a path that receives the current command of the control valve V of the contraction-side chamber R2 of the front-wheel side damper FD for the reduction of the pitching by the front-wheel side damper FD. The calculation unit 48 uses the target torque τ to calculate a pitching reducing damping force Frp to be output to a path that receives the current command of the control valve V of the contraction-side chamber R2 of the rear-wheel side damper RD for the reduction of the pitching by the rear wheel side damper RD.

The regulator 45 uses the vertical direction velocity "v" of the vehicle body B to calculate a bounce reducing damping force Ffb to be output by the front-wheel side damper FD for the reduction of the bounce of the vehicle body B. The regulator 49 uses the vertical direction velocity "v" of the vehicle body B to calculate a bounce reducing damping force Frb to be output by the rear wheel side damper RD for the reduction of the bounce of the vehicle body B. The bounce of the vehicle body B is specifically a bounce near the center of the vehicle body B.

The addition unit 46 adds the pitching reducing damping force Ffp to the bounce reducing damping force Ffb to calculate a target contraction-side damping force Ff* to be output by the front-wheel side damper FD. The addition unit 50 adds the pitching reducing damping force Frp to the bounce reducing damping force Frb to calculate a target contraction-side damping force Fr* to be output by the rear-wheel side damper RD. The calculation unit 47 uses the target contraction-side damping force Ff* to obtain the target pressure Pf*, and the calculation unit 51 uses the target contraction-side damping force Fr* to obtain the target pressure Pr*.

The calculation unit 44 multiplies the target torque τ by a coefficient Klf to obtain the pitching reducing damping force Ffp of the front-wheel side damper FD. The coefficient Klf is a coefficient for converting the target torque τ to the pitching reducing damping force Ffp of the front-wheel side damper FD, and is a value determined in consideration of mainly a distance from the center of gravity of the vehicle body to the mounting position of the front-wheel side damper FD. The calculation unit 44 may perform the map calculation using the target torque τ as the parameter to obtain the pitching reducing damping force Ffp. In any case, the calculation unit 44 obtains the damping force required for the front-wheel side damper FD to reduce the pitching of the vehicle body B as the pitching reducing damping force Ffp.

The calculation unit 48 multiplies the target torque τ by a coefficient Klr to obtain the pitching reducing damping force Frp of the rear-wheel side damper RD. The coefficient Klr is a coefficient for converting the target torque τ to the pitching reducing damping force Frp of the rear-wheel side damper RD, and determined in consideration of mainly a distance from the center of gravity of the vehicle body to the mounting position of the rear-wheel side damper RD. The calculation unit 48 may perform the map calculation using the target torque τ as the parameter to obtain the pitching reducing damping force Frp. In any case, the calculation unit 48 obtains the damping force required for the rear-wheel side damper RD to reduce the pitching of the vehicle body B as the pitching reducing damping force Frp.

The regulator 45 uses the vertical direction velocity "v" of the vehicle body B to obtain the bounce reducing damping force Ffb to be generated by the front-wheel side damper FD. The regulator 45 may multiply the vertical direction velocity "v" by the coefficient simply as a control gain to obtain the bounce reducing damping force Ffb, or may use the function and the map having the vertical direction velocity "v" as the parameter to obtain the bounce reducing damping force Ffb. In any case, the regulator 45 obtains the damping force required for the front-wheel side damper FD to reduce the bounce of the vehicle body B as the bounce reducing damping force Ffb.

The regulator 49 uses the vertical direction velocity "v" of the vehicle body B to obtain the bounce reducing damping force Frb to be generated by the rear-wheel side damper RD. The regulator 49 may multiply the vertical direction velocity "v" by the coefficient simply as a control gain to obtain the bounce reducing damping force Frb, or may use the function and the map having the vertical direction velocity "v" as the parameter to obtain the bounce reducing damping force Frb. In any case, the regulator 49 obtains the damping force required for the rear-wheel side damper RD to reduce the bounce of the vehicle body B as the bounce reducing damping force Frb.

Figure 7:
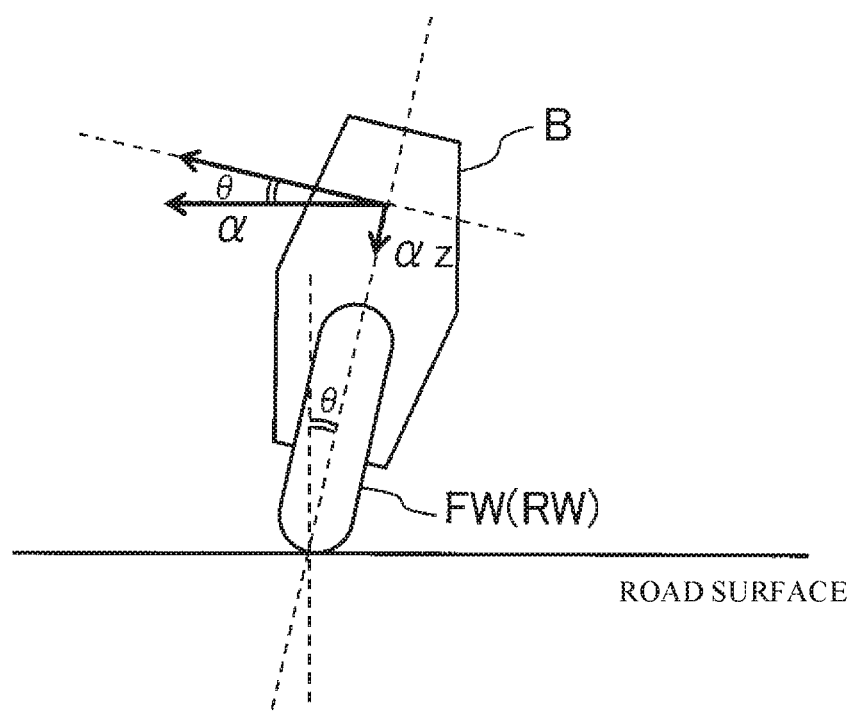
FIG. 7 is a drawing for explaining a centrifugal acceleration during the turning of the two-wheeled vehicle, and component forces of this centrifugal acceleration in the vertical and the lateral directions of the vehicle body.

Here, when the two-wheeled vehicle turns, the vehicle body B needs to be inclined with respect to a road surface to balance with a centrifugal acceleration acting on the vehicle body B during turning. This is to prevent the two-wheeled vehicle from overturning due to the centrifugal acceleration. If the vehicle body B is inclined with respect to the road surface, a centrifugal acceleration α acts in a direction to move the vehicle body B away from a center of rotation of the two-wheeled vehicle, i.e. substantially in a horizontal direction as illustrated in FIG. 7. Thus, a resolved component αz (αz=α·sin θ) of the centrifugal acceleration α acts in a vertical direction of the vehicle body B according to a roll angle θ which is an angle of inclination of the vehicle body B. Accordingly, the resolved component αz of the centrifugal acceleration α corresponding to the roll angle θ of the vehicle body B is superimposed on the vertical acceleration of the vehicle body B detected by the acceleration sensor 42a during the turning of the two-wheeled vehicle. In order to perform the control to reduce the vibration of the vehicle body B in the vertical direction with high accuracy, it is preferred to remove the component of the centrifugal acceleration unrelated to the bounce of the vehicle body B.

Therefore, the regulator 45 and the regulator 49 are preferably configured as follows. That is, the regulator 45 includes a correction unit 45a, and the regulator 49 includes a correction unit 49a, as a centrifugal force correction unit that removes the influence of the centrifugal acceleration. As a damping force calculation unit that executes a calculation for obtaining the bounce reducing damping force using the vertical direction velocity "v", the regulator 45 includes a damping force calculation unit 45b that executes the calculation to obtain the bounce reducing damping force Ffb, and the regulator 49 includes a damping force calculation unit 49b that executes the calculation to obtain the bounce reducing damping force Frb. Then, in each of the regulator 45 and the regulator 49, before the calculation by the damping force calculation unit, the correction unit subtracts a vertical direction velocity "vz," which is obtained by the integration of the decomposed component αz of the centrifugal acceleration α, from the vertical direction velocity "v" to remove the influence of the centrifugal acceleration α.

Thus, if the bounce reducing damping forces Ffb and the bounce reducing damping forces Frb are obtained such as by performing multiplication by the control gains or map calculations after the influence of the centrifugal acceleration α is removed from the vertical direction velocity "v", the bounce reducing damping forces Ffb and the bounce reducing damping forces Frb necessary to reduce only the bounce of the vehicle body B can be obtained. Specifically, the acceleration sensor that detects the acceleration of the vehicle body B in a right-left direction is provided, and assuming that the acceleration in the vertical direction is αz, the acceleration in the right-left direction is αx, and the roll angle is θ, the acceleration αz is represented by a formula αz=αx·tan θ. If the acceleration αz is obtained by doing so, the vertical direction velocity Vz can be obtained by the integration of the acceleration αz. Since the roll angle θ can be obtained by the integration of the roll angular velocity Vr, the roll angle θ that is obtained by such way is used to obtain tan θ. Thus, in obtaining the bounce reducing damping force Ffb and the bounce reducing damping force Frb, removing the influence of the centrifugal acceleration α effectively reduces the vibration of the vehicle body B.

The addition unit 46 adds the pitching reducing damping force Ffp to the bounce reducing damping force Ffb, which are obtained as described above, to calculate the target contraction-side damping force Ff* to be output by the front-wheel side damper FD. As the result of adding the pitching reducing damping force Ffp to the bounce reducing damping force Ffb, when a direction of the contraction-side damping force of the front-wheel side damper FD and a direction of the damping force instructed by the target contraction-side damping force Ff* matches, the target contraction-side damping force Ff* is output as it is, and when both does not match, zero is output. Similarly, the addition unit 50 adds the obtained pitching reducing damping force Frp to the obtained bounce reducing damping force Frb to calculate the target contraction-side damping force Fr* to be output by the rear-wheel side damper RD. As the result of adding the pitching reducing damping force Frp to the bounce reducing damping force Frb, when a direction of the contraction-side damping force of the rear-wheel side damper RD and a direction of the damping force instructed by the target contraction-side damping force Fr* matches, the target contraction-side damping force Fr* is output as it is, and when both does not match, zero is output.

The calculation unit 47 multiplies the target contraction-side damping force Ff* by the coefficient Kaf to obtain the target pressure Pf* of the contraction-side chamber R2 of the front-wheel side damper FD. The coefficient Kaf is a coefficient for converting the target contraction-side damping force Ff* to the target pressure Pf* of the contraction-side chamber R2 of the front-wheel side damper FD, and determined in consideration of mainly the cross-sectional area of the piston 11. The calculation unit 51 multiplies the target contraction-side damping force Fr* by the coefficient Kar to obtain the target pressure Pr* of the contraction-side chamber R2 of the rear wheel side damper RD. The coefficient Kar is a coefficient for converting the target contraction-side damping force Fr* to the target pressure Pr* of the contraction-side chamber R2 of the rear-wheel side damper RD, and determined in consideration of mainly the cross-sectional area of the piston 11.

When the target pressure Pf* and the target pressure Pr* are thus obtained, the pressure feedback loop in each path is used for obtaining the current command If and the current command Ir as well as the damper control device 1. Then, the current is supplied to the control valve V of the front-wheel side damper FD and the rear-wheel side damper RD as the current command to control the pressure of the contraction-side chamber R2 of the front-wheel side damper FD and the rear-wheel side damper RD.

Thus, the damper control device 41 can reduce the vibration of the vehicle body B in consideration of not only the pitching but also the bounce of the vehicle body B. Specifically, according to the damper control device 41, by correcting the pitching reducing damping force for reducing the pitching with the bounce reducing damping force in a process of obtaining the target pressure Pf* and the target pressure Pr*, not only sinking but also floating-up of the vehicle body B can effectively be reduced. This further improves the riding comfort on the two-wheeled vehicle.

In the damper control device 41, when the regulator 45 and the regulator 49 multiply the vertical direction velocity "v" by the coefficient to obtain the bounce reducing damping force Ffb and the bounce reducing damping force Frb, the control approximate to the sky hook control can be performed. This effectively reduces the vibration of the vehicle body B.

Figure 8:
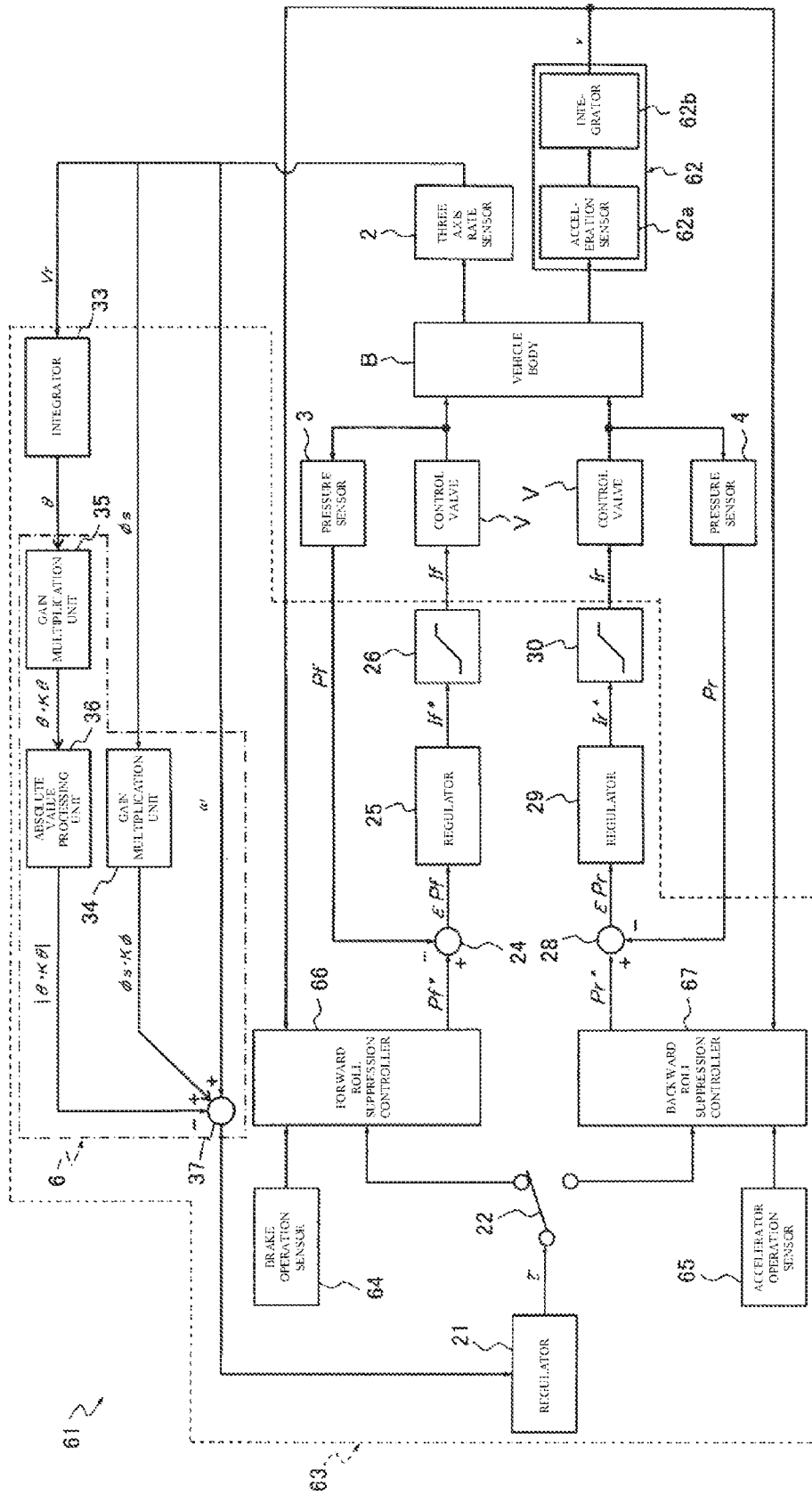
FIG. 8 is a control block diagram of a damper control device according to a different embodiment.

Next, a damper control device 61 according to a different embodiment is described. As illustrated in FIG. 8, the damper control device 61 includes a velocity detection unit 62 that detects the vertical direction velocity "v" of the vehicle body B, a brake operation sensor 64 that detects a brake operation of an occupant of the two-wheeled vehicle to input a brake signal to a control unit 63, and an accelerator operation sensor 65 that detects an accelerator operation of the occupant of the two-wheeled vehicle to input an accelerator signal to the control unit 63. The damper control device 61 not only enables the control unit 63 to consider the vertical direction velocity, but also enables a control system for the pitching of the vehicle body B with a sinking front-wheel side and a control system for the pitching of the vehicle body B with a sinking rear-wheel side to be separately designed.

The following describes the point of the difference between the damper control device 61 of the different embodiment and the damper control device 1 of the one embodiment in detail. Similar members and the like are only denoted by the same reference signs and not described in detail since description is repeated.

The velocity detection unit 62 includes an acceleration sensor 62a that detects the acceleration of the vehicle body B in the vertical direction, and an integration unit 62b that integrates the acceleration of the vehicle body B in the vertical direction detected by the acceleration sensor 62a to obtain the vertical direction velocity "v" of the vehicle body B. The integration unit 62b may be integrated into the control unit 63. The vertical direction velocity "v" is input to the control unit 63.

When the occupant applies a brake, the brake operation sensor 64 outputs the brake signal, which is identifiable by the control unit 63 to detect that the brake has been turned on, to the control unit 63. When the occupant turns on an accelerator, the accelerator operation sensor 65 outputs the accelerator signal, which is identifiable by the control unit 63 to detect that the accelerator has been turned on, to the control unit 63.

Compared with the control unit 5 of the damper control device 1 of the one embodiment, the control unit 63 includes a forward roll suppression controller 66 on a path for obtaining the current command of the control valve V of a contraction-side chamber R2 of a front-wheel side damper FD instead of the multiplication unit 23, and includes a backward roll suppression controller 67 on a path for obtaining the current command of the control valve V of a contraction-side chamber R2 of a rear-wheel side damper RD instead of the multiplication unit 27.

When the switch 22 selects the front-wheel side damper FD, the forward roll suppression controller 66 obtains the target pressure Pf* of the contraction-side chamber R2 of the front-wheel side damper FD on the basis of the target torque τ, the vertical direction velocity "v," and the presence or absence of the brake signal. Specifically, for example, the forward roll suppression controller 66 uses the target torque τ to obtain the damping force required for reducing the pitching, uses the vertical direction velocity "v" to obtain the damping force required for reducing the bounce, and adds these damping forces to obtain the contraction-side damping force of the front-wheel side damper FD. Furthermore, when the brake signal is present, the forward roll suppression controller 66 multiplies the contraction-side damping force by the coefficient of equal to or more than one or adds a value proportionate to a brake force to output the target pressure Pf*. When the brake signal is absent, the forward roll suppression controller 66 outputs the contraction-side damping force as it is as the target pressure Pf*. The calculation method of the target pressure Pf* in the forward roll suppression controller 66 is not limited to this, and can be changed to be optimal for the two-wheeled vehicle to which the damper control device 61 is applied.

When the switch 22 selects the rear-wheel side damper RD, the backward roll suppression controller 67 obtains the target pressure Pr* of the contraction-side chamber R2 of the rear-wheel side damper RD on the basis of the target torque τ, the vertical direction velocity "v," and the presence or absence of the accelerator signal. Specifically, for example, the backward roll suppression controller 67 uses the target torque τ to obtain the damping force required for reducing the pitching, uses the vertical direction velocity "v" to obtain the damping force required for reducing the bounce, and adds these damping forces to obtain the contraction-side damping force of the rear-wheel side damper RD. Furthermore, when the accelerator signal is present, the backward roll suppression controller 67 multiplies the contraction-side damping force by the coefficient of equal to or more than one to output the target pressure Pr* or outputs the target pressure Pr* proportionate to an accelerator position. When the accelerator signal is absent, the backward roll suppression controller 67 outputs the contraction-side damping force as it is as the target pressure Pr*. The calculation method of the target pressure Pr* in the backward roll suppression controller 67 is not limited to this, and can be changed to be optimal for the two-wheeled vehicle to which the damper control device 61 is applied.

When the target pressures Pf* and Pr* are thus obtained, the pressure feedback loop in each path is used for obtaining the current command If and the current command Ir as well as the damper control device 1. Then, the current is supplied to the control valve V of the front-wheel side damper FD and the rear-wheel side damper RD as the current command to control the pressure of the contraction-side chamber R2 of the front-wheel side damper FD and the rear-wheel side damper RD.

Thus, the damper control device 61 enables a control optimal for the pitching of the vehicle body B toward a forward roll side and a control optimal for the pitching of the vehicle body B toward a backward roll side to be separately and independently designed. the damper control device 61 can control a posture more corresponding to the behavior of the two-wheeled vehicle and a driving situation, wherefore ride comfort can be improved.

In the damper control device 61, both the control of the forward roll pitching and the control of the backward roll pitching are easily designed as an independent linear controller. Then, according to the damper control device 61, an input distinctive to the forward roll pitching, in this case, capturing the brake signal ensures the control specialized to the forward roll pitching to be used for the effective reduction of the forward roll pitching. An input distinctive to the backward roll pitching, in this case, capturing the accelerator signal ensures the control specialized to the backward roll pitching to be used for the effective reduction of the backward roll pitching.

It should be noted that, as well as the damper control device 41 of the other embodiment, the above-described damper control device 61 of the different embodiment also may use the forward roll suppression controller 66 and the backward roll suppression controller 67 to perform the calculation for removing the component of the centrifugal acceleration superimposed on the vertical direction velocity "v," which is detected by the velocity detection unit 62, in order to remove the influence of the centrifugal acceleration acting to the vehicle body B while the vehicle body B inclines.

In the above description, the pressure sensor 3 as the front-wheel side pressure detection unit and the pressure sensor 4 as the rear-wheel side pressure detection unit are used to detect the pressure of the contraction-side chamber R2 of the front-wheel side damper FD and the rear-wheel side damper RD.

However, it is also possible to detect the damping forces generated in the front-wheel side damper FD and the rear-wheel side damper RD by measuring stresses of the piston rods 12 and mounting members of the front-wheel side damper FD and the rear-wheel side damper RD on the vehicle body B of the two-wheeled vehicle by strain gauges or detect the damping forces of the front-wheel side damper FD and the rear-wheel side damper RD by force sensors and divide these damping forces by the cross-sectional areas of the pistons 11 to obtain the pressures of the contraction-side chambers R2.

Accordingly, the front-wheel side pressure detection unit and the rear-wheel side pressure detection unit may be configured by the strain sensors and the force sensors as described above and processing devices that performs an arithmetic processing for obtaining the pressure of the contraction-side chamber R2 using the damping force detected by the strain gauge and the force sensor. These processing devices may be integrated into the control unit 5, the control unit 43, and the control unit 63.

Furthermore, as described above, the relation between the damping force generated by the front-wheel side damper FD and the rear-wheel side damper RD and the pressure of the contraction-side chambers R2 in the front-wheel side damper FD and the rear-wheel side damper RD is approximately proportionate. Then, the damping forces can be directly treated as the pressures of the contraction-side chambers R2 of the front-wheel side damper FD and the rear-wheel side damper RD by setting gains. Accordingly, the damping force can be fed back to obtain the target pressure Pf* and the target pressure Pr* of the contraction-side chamber R2. Then, the front-wheel side pressure detection unit and the rear-wheel side pressure detection unit may detect the damping force of the front-wheel side damper FD and the rear-wheel side damper RD.

Embodiments of this invention were described above, but the above embodiments are merely examples of applications of this invention, and the technical scope of this invention is not limited to the specific constitutions of the above embodiments.

This application claims priority based on Japanese Patent Application No. 2014-088795 filed with the Japan Patent Office on Apr. 23, 2014, the entire contents of which are incorporated into this specification.

The invention claimed is:

1. A damper control device comprising:
   a pitching angular velocity detection unit configured to detect a pitching angular velocity of a vehicle body of a two-wheeled vehicle;
   a roll angle detection unit configured to detect a roll angle of the vehicle body;
   a yaw angular velocity detection unit configured to detect a yaw angular velocity of the vehicle body;
   a front-wheel side pressure detection unit configured to detect a pressure of a contraction-side chamber in a front-wheel side damper, the front-wheel side damper being interposed between the vehicle body and a front-wheel of the two-wheeled vehicle;
   a rear-wheel side pressure detection unit configured to detect a pressure of a contraction-side chamber in a rear-wheel side damper, the rear-wheel side damper being interposed between the vehicle body and a rear-wheel of the two-wheeled vehicle; and
   a correction unit configured to correct the pitching angular velocity on the basis of the roll angle and the yaw angular velocity, the correction unit being configured to remove a component based on the roll angle and the yaw angular velocity from the detected pitching angular velocity during turning of the two-wheeled vehicle, wherein
   the pressure of the contraction-side chamber in the front-wheel side damper and the pressure of the contraction-side chamber in the rear-wheel side damper are controlled on the basis of the corrected pitching angular velocity, the pressure of the contraction-side chamber in the front-wheel side damper, and the pressure of the contraction-side chamber in the rear-wheel side damper.

2. The damper control device according to claim 1, wherein
   the correction unit includes a high-pass filter configured to filter the pitching angular velocity detected by the pitching angular velocity detection unit.

3. The damper control device according to claim 1, wherein
   a target torque that reduces the pitching of the vehicle body is obtained using the corrected pitching angular velocity, the damper that is contracted by the pitching is selected out of the front-wheel side damper and the rear-wheel side damper using the target torque, a target pressure of the contraction-side chamber in the selected damper is obtained, and the pressure of the contraction-side chamber of the selected damper is fed back to control the pressure of the contraction-side chamber of the selected damper.

4. The damper control device according to claim 1, further comprising
   a velocity detection unit configured to detect a vertical direction velocity of the vehicle body, wherein
   a target torque that reduces the pitching of the vehicle body is obtained using the corrected pitching angular velocity,
   a pitching reducing damping force of a front-wheel side and a pitching reducing damping force of a rear-wheel side are obtained using the target torque, the pitching reducing damping force of the front-wheel side being required for reducing the pitching of the front-wheel side damper, the pitching reducing damping force of the rear-wheel side being required for reducing the pitching of the rear-wheel side damper,
   a bounce reducing damping force of the front-wheel side and a bounce reducing damping force of the rear-wheel side are obtained using the vertical direction velocity, the bounce reducing damping forced being required for reducing the bounce near a center of the vehicle body,
   a target front-wheel side pressure of the contraction-side chamber in the front-wheel side damper is obtained using the pitching reducing damping force of the front-wheel side and the bounce reducing damping force of the front-wheel side, and the pressure of the contraction-side chamber of the front-wheel side damper is fed back to control the pressure of the contraction-side chamber of the front-wheel side damper, and
   a target rear-wheel side pressure of the contraction-side chamber in the rear-wheel side damper is obtained using the pitching reducing damping force in the rear-wheel side and the bounce reducing damping force in the rear-wheel side, and the pressure of the contraction-side chamber of the rear-wheel side damper is fed back to control the pressure of the contraction-side chamber of the rear-wheel side damper.

5. The damper control device according to claim 4, further comprising
   a centrifugal force correction unit configured to remove an influence of a centrifugal acceleration using the vertical direction velocity of the vehicle body.

6. The damper control device according to claim 1, further comprising
   a velocity detection unit configured to detect a vertical direction velocity of the vehicle body, wherein
   a target torque that reduces the pitching of the vehicle body is obtained using the corrected pitching angular velocity,
   the damper that is contracted by the pitching is selected out of the front-wheel side damper and the rear-wheel side damper using the target torque, a target pressure of the contraction-side chamber in the selected damper is obtained on the basis of the target torque and the vertical direction velocity, and the pressure of the contraction-side chamber in the selected damper is fed back to control the pressure of the contraction-side chamber in the selected damper.

7. The damper control device according to claim 6, wherein
   when the front-wheel side damper is selected, the target pressure of the contraction-side chamber in the front-wheel side damper is obtained on the basis of the target torque, the vertical direction velocity, and a brake signal of the two-wheeled vehicle.

8. The damper control device according to claim 6, wherein
when the rear wheel side damper is selected, the target pressure of the contraction-side chamber in the rear-wheel side damper is obtained on the basis of the target torque, the vertical direction velocity, and an accelerator signal of the two-wheeled vehicle.

9. The damper control device according to claim 1, wherein
the front-wheel side damper and the rear-wheel side damper include:
a cylinder;
a piston slidably inserted into the cylinder, the piston partitioning the inside of the cylinder into the contraction-side chamber filled by liquid and an expansion-side chamber filled by liquid;
a reservoir that communicates with the contraction-side chamber,
an expansion-side damping passage configured to give a resistance to a flow of the liquid from the expansion-side chamber to the contraction-side chamber;
a contraction-side passage provided in parallel with respect to the expansion-side damping passage, the contraction-side passage allowing only a flow of the liquid from the contraction-side chamber to the expansion-side chamber;
a contraction-side damping passage configured to give a resistance to a flow of the liquid from the contraction-side chamber to the reservoir;
a suction passage provided in parallel with respect to the contraction-side damping passage, the suction passage allowing only a flow of the liquid from the reservoir to the contraction-side chamber;
a bypass passage provided in parallel with respect to the contraction-side damping passage and the suction passage, the bypass passage allowing the contraction-side chamber to communicate with the reservoir; and
a pressure control element provided at the bypass passage and configured to adjust the pressure of the contraction-side chamber.

* * * * *